US006823049B2

(12) United States Patent
Tsai et al.

(10) Patent No.: US 6,823,049 B2
(45) Date of Patent: Nov. 23, 2004

(54) APPARATUS AND METHOD IN INTELLIGENT TYPE FOR FILTERING A DISTURBANCE OF INCOMING PHONE CALL

(75) Inventors: Tony Tsai, Taipei (TW); Li Yu, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 75 days.

(21) Appl. No.: 10/279,101

(22) Filed: Oct. 24, 2002

(65) Prior Publication Data

US 2004/0081303 A1 Apr. 29, 2004

(51) Int. Cl.[7] .................................................. H04M 1/64
(52) U.S. Cl. ................................ 379/88.19; 379/213.01
(58) Field of Search ............................ 379/88.19, 88.2, 379/88.21, 207.03, 213.01

(56) References Cited

U.S. PATENT DOCUMENTS 6,421,439 B1 * 7/2002 Liffick .................. 379/211.02
6,453,037 B1 * 9/2002 Welter, Jr. .................. 379/243
6,567,671 B2 * 5/2003 Amin ........................ 455/550
6,574,470 B1 * 6/2003 Chow et al. ................ 455/417
6,631,182 B1 * 10/2003 Schwab et al. .......... 379/88.19
6,631,186 B1 * 10/2003 Adams et al. ......... 379/211.02

* cited by examiner

*Primary Examiner*—Creighton Smith
(74) *Attorney, Agent, or Firm*—Birch, Stewart, Kolasch & Birch, LLP

(57) ABSTRACT

An apparatus in an intelligent type for filtering a disturbance for an incoming phone call includes a phone call data bank, a user's interface device, a register module, and a filtering module of incoming phone call. The phone call data bank stores at least one phone call data, and the phone call data includes an identification type. The user interface device receives a filtering flag set by the user to the phone call data, having the similar identification type. The register module stores a phone number of the incoming phone call when a request for signal connection is received. The filtering module of incoming phone call compares the phone number of the incoming phone call with the filtering flag of the phone call data bank, so as to judge whether or not the phone number of the incoming call needs to be screened. The present invention also provides a method in an intelligent type for filtering a disturbance for an incoming phone call.

14 Claims, 6 Drawing Sheets

Start
choose the identification type S401
S402 setting or removing the filtering flag
removing
setting up
removing the filtering flag S401
S404 setting the filtering flag
S405 setting the screening time period
S406 setting the voice mailbox
End

| | | | | |
|---|---|---|---|---|
| 231 | an index code | 01 | ... | 99 |
| 232 | name | Bill | ... | John |
| 233 | phone number | (01) 2345678 | ... | (08) 7654321 |
| 234 | identification type | client | ... | friend |
| 235 | filtering flag | Yes | ... | No |
| 236, 2361 | screening time period: screening starting time | 1700 | ... | |
| 236, 2362 | screening time period: screening ending time | 0900 | ... | |
| 237 | voice mailbox | now is at off work time | ... | |

FIG. 2

APPARATUS AND METHOD IN INTELLIGENT TYPE FOR FILTERING A DISTURBANCE OF INCOMING PHONE CALL

This application incorporates by reference of Taiwan application Serial No. 090126661, filed. Oct. 26, 2001.

BACKGROUND OF THE INVENTION

1. Field of the Invention

The present invention relates to an apparatus and a method in intelligent type for filtering a disturbance for the incoming phone call, and more particularly to an apparatus and a method in intelligent type for filtering a disturbance for the incoming phone call, which can manage the phone call information by a concept of grouping structure, so as to provide the filtering function for the incoming phone call.

2. Description of Related Art

As the mobile communication technology is developed in great progress, the mobile telephone has been the most common of the communication tools, and due to the characteristics of lightness, compactness, and portability, it has brought much convenience to the user. However, as the mobile telephone has become a mainstream everyday communication tool, it also brings some undesirable situations for the user. The main issue is due to the situation of phone calls arriving at an improper time or simply being undesired. For example, during the working time period, phone calls from someone other than the clients may be inappropriate. Also, during the vacation, phone calls from the clients may not be desired. While driving, it may not be proper to receive the phone call. Or, when one attends a meeting or an entertaining show, the phone call is also prevented from being received, due to the polite manner. In all of the foregoing situations, it is inevitable to be disturbed by a ringing or shaking signal.

In the conventional technology, in order to solve the foregoing problems, the mobile phones in the current market have the function of showing the information about the incoming phone call. In other words, when the incoming phone call is made, the displaying panel will display a phone number and/or name of the incoming phone call. The user can determine whether or not to receive the phone call, based upon the information on the display panel. Or, the user can set up the condition with respect to a single phone number, so that the mobile phone can automatically process the incoming phone call according to the condition set by the user.

The disadvantage in the foregoing method is that the user is required to make a judgment or it is still short of the concept of management by the group manner. With the current filtering method for the incoming phone call, for each phone call information, the user is required to respectively set the filtering condition for each one or to add the conditions one by one into the screening data bank. If the user is in the off work time period and a condition is set to screen the phone call from the clients, then upon returning to the work time period, the user is required to remove the screening instructions again with respect to the phone number information for each client, or to remove the concerning phone number from the screening data bank, or even to set the incoming phone calls other than the clients being screened. In this situation, the procedure for repeatedly setting the conditions is very tedious. It consumes much of the user's time.

As described above, it is an essential issue to develop a solution of how to manage the phone call information by a grouping manner, so as to prevent the repetitious procedure of setting the screening conditions.

SUMMARY OF THE INVENTION

It is therefore an objective of the present invention to provide an apparatus in an intelligent type for filtering a disturbance for an incoming phone call. It can based on the phone call information recorded in the phone call data bank, so as to compare the incoming phone call by a concept of grouping manner and to filter the incoming phone calls.

In accordance with the foregoing and other objectives of the present invention, an apparatus in an intelligent type for filtering a disturbance for an incoming phone call includes at least a phone call data bank, which stores at least one phone call data. The phone call data comprises an identification type. A user interface device is used to receive a filtering flag set by the user with respect to the phone call data, which have the similar identification type. A register module is used to store the phone number of the incoming phone call when a request for signal connection is received. Also, a filtering module of the incoming phone call is used to compare the phone number of the incoming phone call with the filtering flag of the phone call data bank, so as to judge whether or not the phone number of the incoming call needs to be screened.

In the aspect of one of the embodiments of the present invention, the phone call data bank further stores a screening period with respect to the filtering flags. Also, the user interface can further allow the user to set the screening period with respect to the phone call data having the same identification type. The screening period can include a screening starting time and a screening ending time.

In another embodiment of the present invention, the filtering module is based on the comparing result, and makes a rejection of the signal connection for those incoming phone calls, which are desired to be screened. The manner of rejecting the signal connection can be issuing a line busy signal or transferring the call to a voice mailbox.

The present invention also provides a method in an intelligent type for filtering a disturbance for an incoming phone call. The method comprises storing at least one phone call data in a phone call data bank, and the phone call data includes an identification type. A filtering flag setting, which is set by the user with respect to the phone call data with the same as the identification type, is allowed. Additionally, when a request for the signal connection is received, the phone number of the incoming phone call is temporarily stored in a register module and then compared with the filtering flag of the phone call data, so as to judge whether or not the phone number of incoming phone call needs to be screened.

Since the apparatus and the method in intelligent type for filtering a disturbance for the incoming phone call of the present invention is based on the need of the user, so as to set a filtering flag with a unified condition with respect to the phone numbers belonging to the identification type that is desired to be screened. A concept of grouping manner is used to manage and filter the phone call data of the phone call data bank. As a result, the situation of repeatedly setting the screening condition can be avoided, so as to greatly reduce the amount of time and the frequency required for the procedure. The present invention can allow the user to manage the incoming phone calls with better efficiency.

BRIEF DESCRIPTION OF DRAWINGS

The invention can be more fully understood by reading the following detailed description of the preferred embodiments, with reference made to the accompanying drawings, wherein:

FIG. 2 is a drawing of a block diagram, schematically illustrating the data structure of the phone call data bank, according to a preferred embodiment of the present invention;

DETAILED DESCRIPTION OF PREFERRED EMBODIMENTS

In the following description, the apparatus and the method in an intelligent type for filtering a disturbance for an incoming phone call according to the embodiments of the present invention with the accompanied drawings are provided, in which the same elements are indicated with the same reference number.

Figure 1:
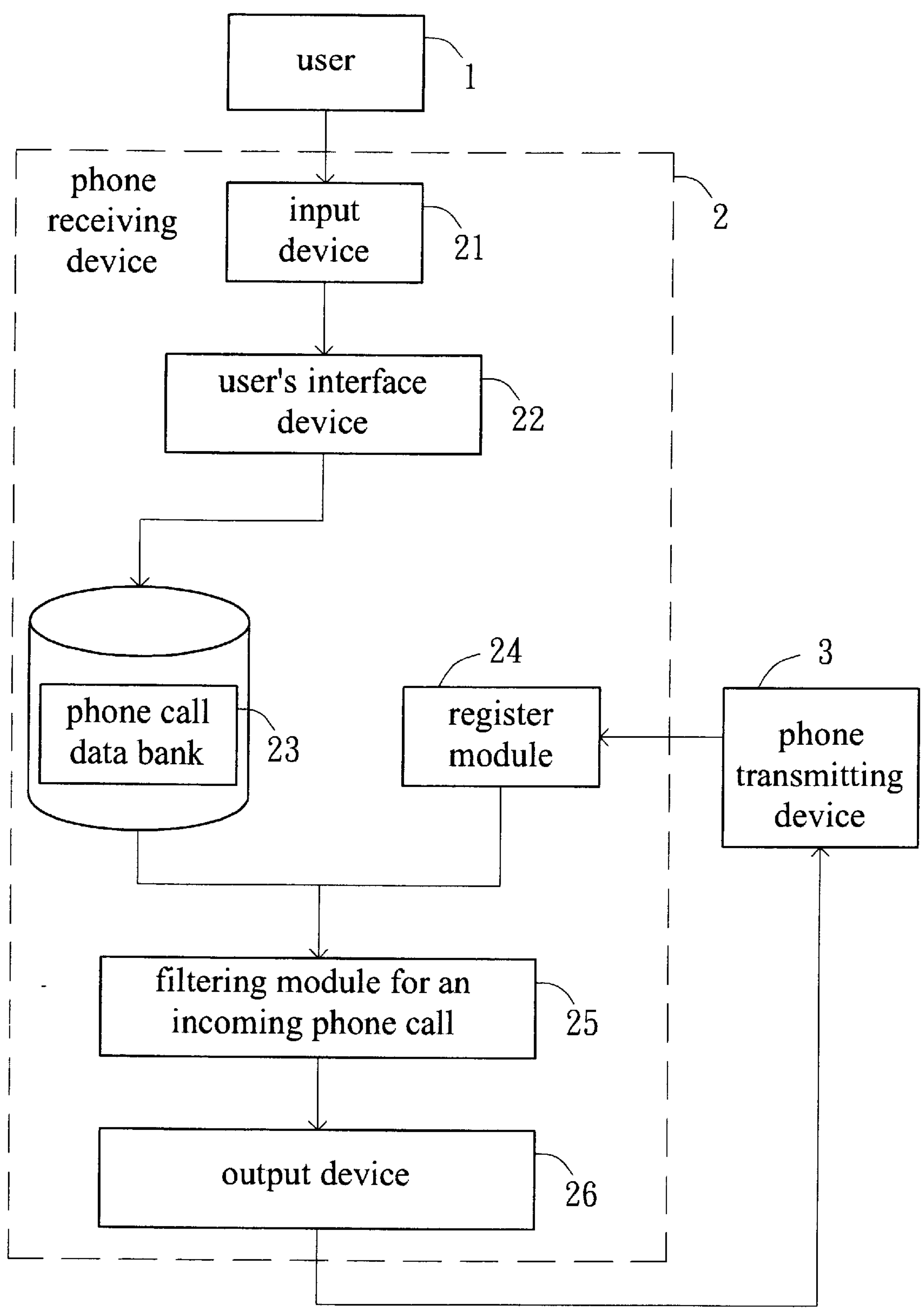
FIG. 1 is a drawing of a block diagram, schematically illustrating an architecture of the apparatus in intelligent type for filtering a disturbance for the incoming phone call, according to a preferred embodiment of the present invention.

Referring to FIG. 1, the apparatus in an intelligent type for filtering a disturbance for an incoming phone call according to one embodiment of the present invention is applied to a phone receiving device 2. The apparatus in an intelligent type for filtering a disturbance for an incoming phone call includes a user's interface device 22, a phone call data bank 23, a register module 24, and a filtering module for an incoming phone call 25. The user's interface device 22 allows a user 1 to perform a setup with respect to the phone call data. The phone call data bank 23 stores at least one phone call data. The register module 24 is used to temporarily store a phone number of the incoming phone call when a request for signal connection is received. The filtering module for the incoming phone call 25 is used to compare the phone number of the incoming call with the phone call data of the phone call data bank 23, so as to judge whether or not the phone number of the incoming call needs to be screened. The phone receiving device 2 further includes an input device 21 and an output device 26.

Referring to FIG. 2, the phone call data bank 23 is first set up by the user 1, in which each of the stored phone call data includes an index code 231, a name 232, a phone number 233, an identification type 234, a filtering flag 235, a screening time period 236, and a voice mailbox 237. Each index code 231 for each of the phone call data is different. In addition to the name 232, it can provide for the user 1 to promptly search for the specific phone name 233. The identification type 234 records the type belonging to the person with respect to the phone number 233, such as the family, the friend, or the client, and so on, so as to set up and manage them in a grouping manner. The filtering flag 235 and the screening time period 236 are set with respect to the group that is formed according to each of the identification types 234, wherein the screening time period 236 at the same time includes a screening starting time 2361 and a screening ending time 2362. When the filtering flag 235 of the identification type 234 is at the activated status, and the time of the incoming phone call is within the screening time period, all of the incoming phone calls belonging to the set identification type 234 are screened. At the same time, a line busy signal is issued or the corresponding voice mailbox 237 is outputted, according to the option set by the user 1.

In the embodiment, the phone receiving device 2 can be a wireless type portable telephone having a microprocessor and a storage unit, wherein the memory unit can include a random access memory (RAM) or a flash memory. The storage unit can also be a read only memory or a flash memory, and the phone call data bank 23 and the register module 24 are a part of the storage unit. The filtering module for an incoming phone call 25 is a software module stored in the storage unit. The microprocessor is used to execute the function of the filtering module for an incoming phone call 25, so as to obtain the phone number from the register module 24 and to store it in the storage unit. Then, the phone call data of the phone call data bank 23 is compared one by one, so as to obtain the identification type belonging to the phone number of incoming phone call, and further automatically process the incoming phone call according to the screening conditions set by the user 1.

It should be noted that in the actual operation, the foregoing phone call data bank 23 and the register module 24 can also use an additional hardware module for use as storage. Likewise, the filtering module for an incoming phone call 25 can also be separated from the storage unit, or can be independently formed as a hardware module such as the chipset with the specific function.

In addition, in the embodiment, the input device 21 can include a standard keyboard of a consultative committee for international telephone and telegraph (CCITT) and at least one auxiliary input key. In this manner, the user 1 can directly use the CCITT standard keyboard to input the phone call information character by character or use the auxiliary input key to search over the phone call data. After the setup or a confirmation for the phone call data as desired, the corresponding data with respect to each of the phone call data is further set up, such as the identification type 234, or the filtering flag 235, the screening time period 236, the voice mailbox 237, and so on set for the group that is formed with respect to the identification type 234.

In order to make the content of the present invention to be better understood, an embodiment is provided in the following as described by the process flow diagram for the method in an intelligent type for filtering a disturbance for an incoming phone call.

Figure 3:
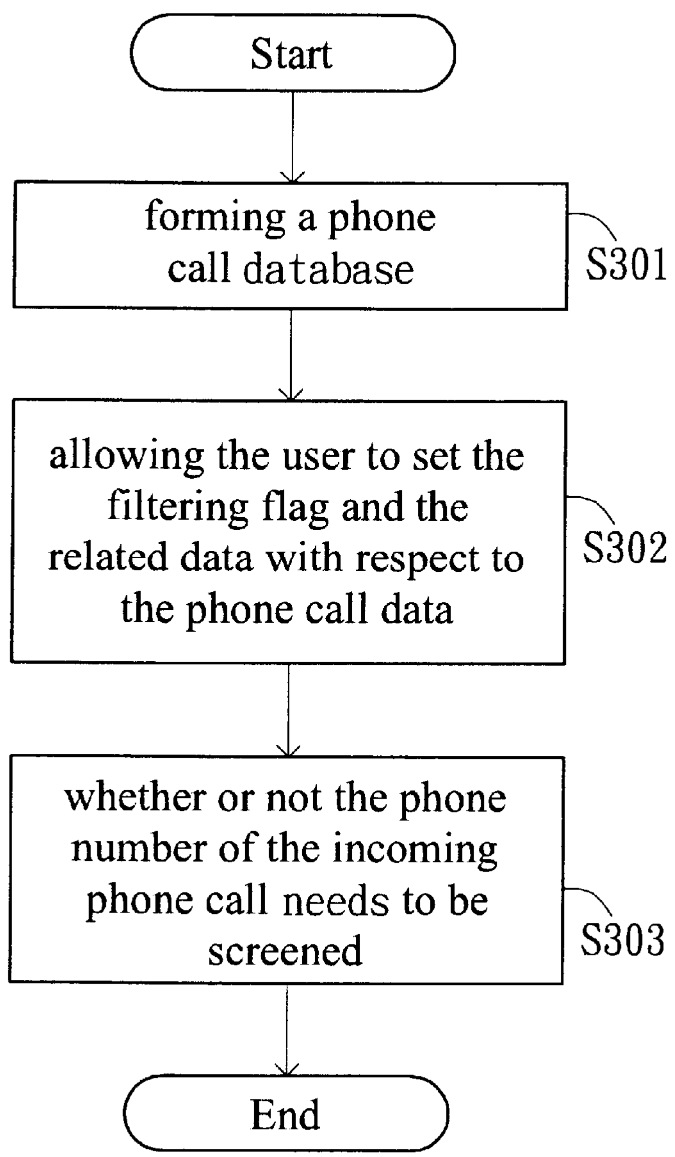
FIG. 3 is a process flow diagram, schematically illustrating a method of the apparatus in intelligent type for filtering a disturbance for the incoming phone call, according to a preferred embodiment of the present invention.

Referring to FIG. 3, the method in an intelligent type for filtering a disturbance for an incoming phone call, according to the embodiment of the present invention, includes the steps of forming a phone call data bank 23 in the step S301; allowing the user 1 to set the filtering flag 235 and the related data with respect to the phone call data in the step S302; and judging whether or not the phone number of the incoming phone call needs to be screened in the step S303 when a request of signal connection is received.

Figure 4A:
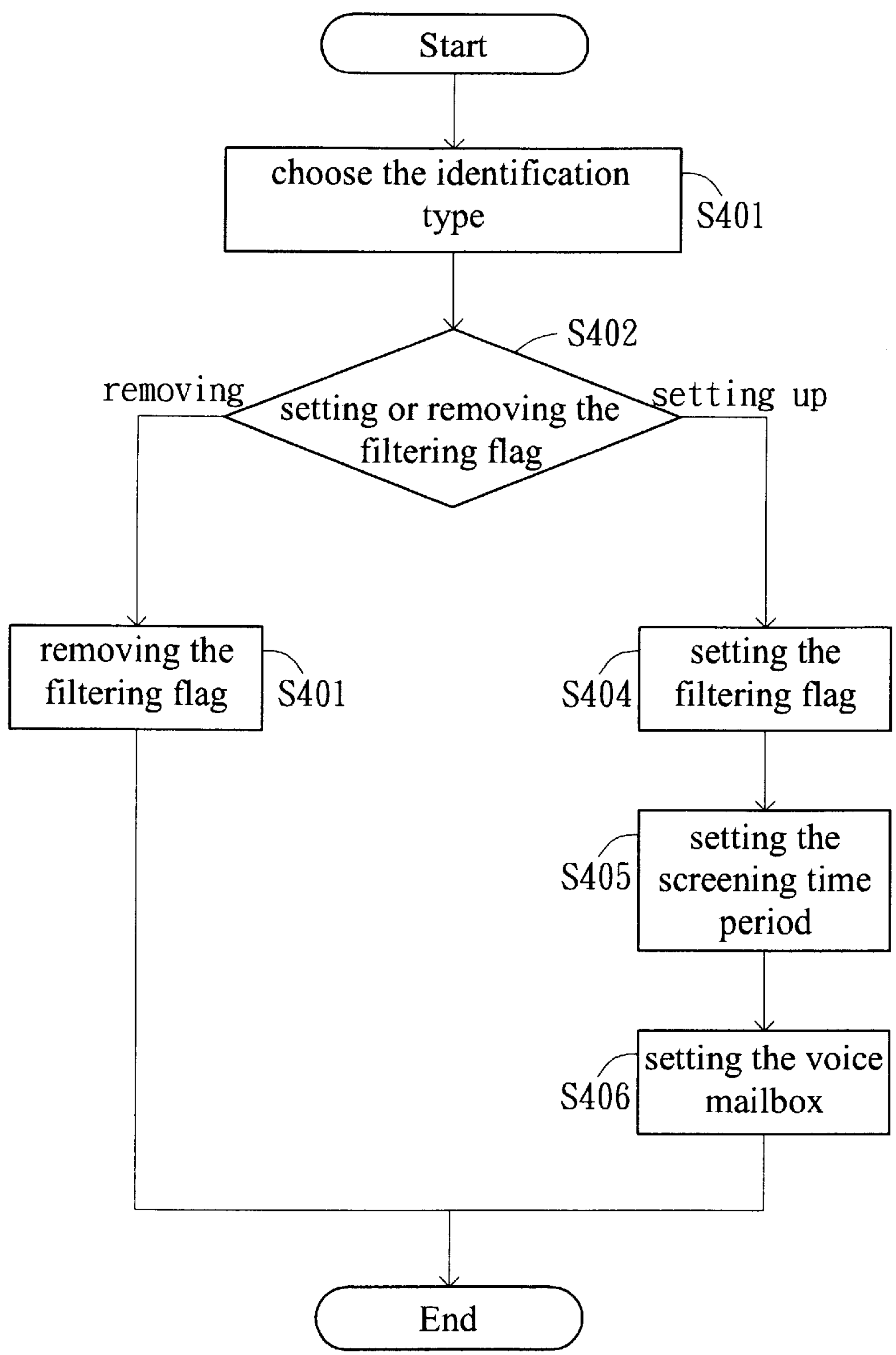
FIG. 4*a* is a process flow diagram, schematically illustrating a procedure for the user to use the user's interface device for setting the filtering of the incoming phone call, according to a preferred embodiment of the present invention.

Referring to FIG. 4*a*, in the step 302 (S302), the user's interface device 22 provide for the user 1 to perform a filtering setup for the incoming phone call with respect to the phone call data, which have the same identification type 234. At first, the user's interface device 22 receives the desired identification type 234 that is selected by the user 1, in the step S401. Then, an option is selected for setting up the filtering flag 235 or removing the filtering flag 235 that has been set, in the step S402. According to the option selected by the user 1, the action to remove the filtering flag 235 is executed, in the step S403, or the action to set up the filtering flag 235 is executed, in the step S404. If the user 1 chooses the action to set up the filtering flag 235, then after the filtering flag 235 is set, it is further provided for the user 1 to set up the screen time period 235 in the step S405. Also, the voice mailbox 237 is set up, according to the actual need, in the step S406.

Figure 4B:
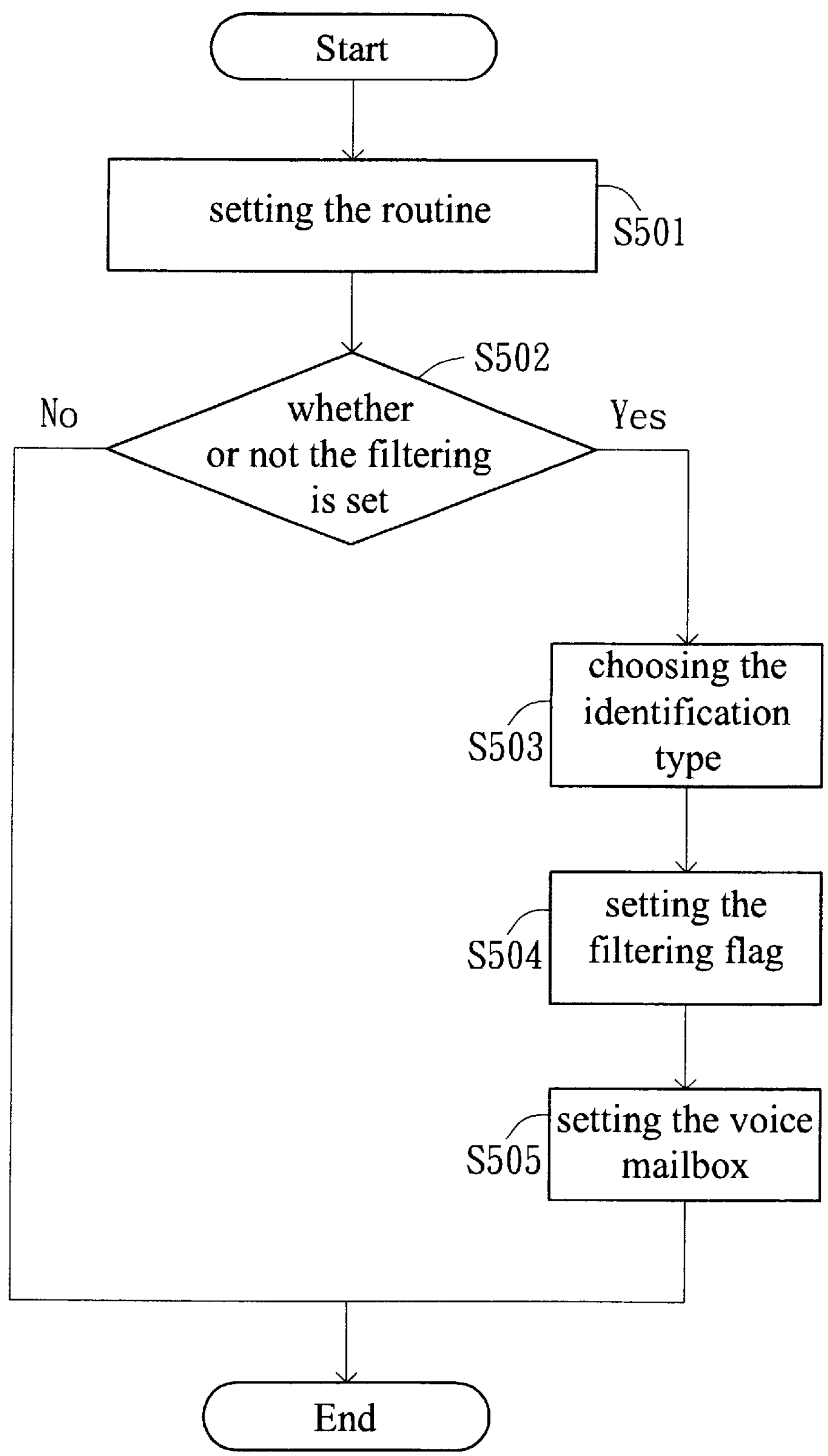
FIG. 4*b* is a process flow diagram, schematically illustrating a procedure for the user to use the user's interface device for setting the filtering of the incoming phone call after a routine is set, according to a preferred embodiment of the present invention.

Referring to FIG. 4*b*, the user's interface device 22 at the same time also provides for the user 1 to perform a set up for filtering the incoming phone call with respect to the phone call data having the same identification type 234 after a routine is completely set. First, the user 1 sets a routine in the step S501. Then, the user 1 decides whether or not a filtering for the incoming phone call is set for this routine, in the step S502. If the user 1 chooses that the filtering for the incoming phone call is to be set, then the user 1 is requested to choose the identification type 234 to be set, in the step S503. Next, the filtering flag 235 is set in the step S504. Also, according to the actual need, a voice mailbox 237 is set in the step S505. The screening starting time 2361 and the screening ending time 2362 of the screening time period 236 are with respect to the routine starting time and the routine ending time.

Figure 5:
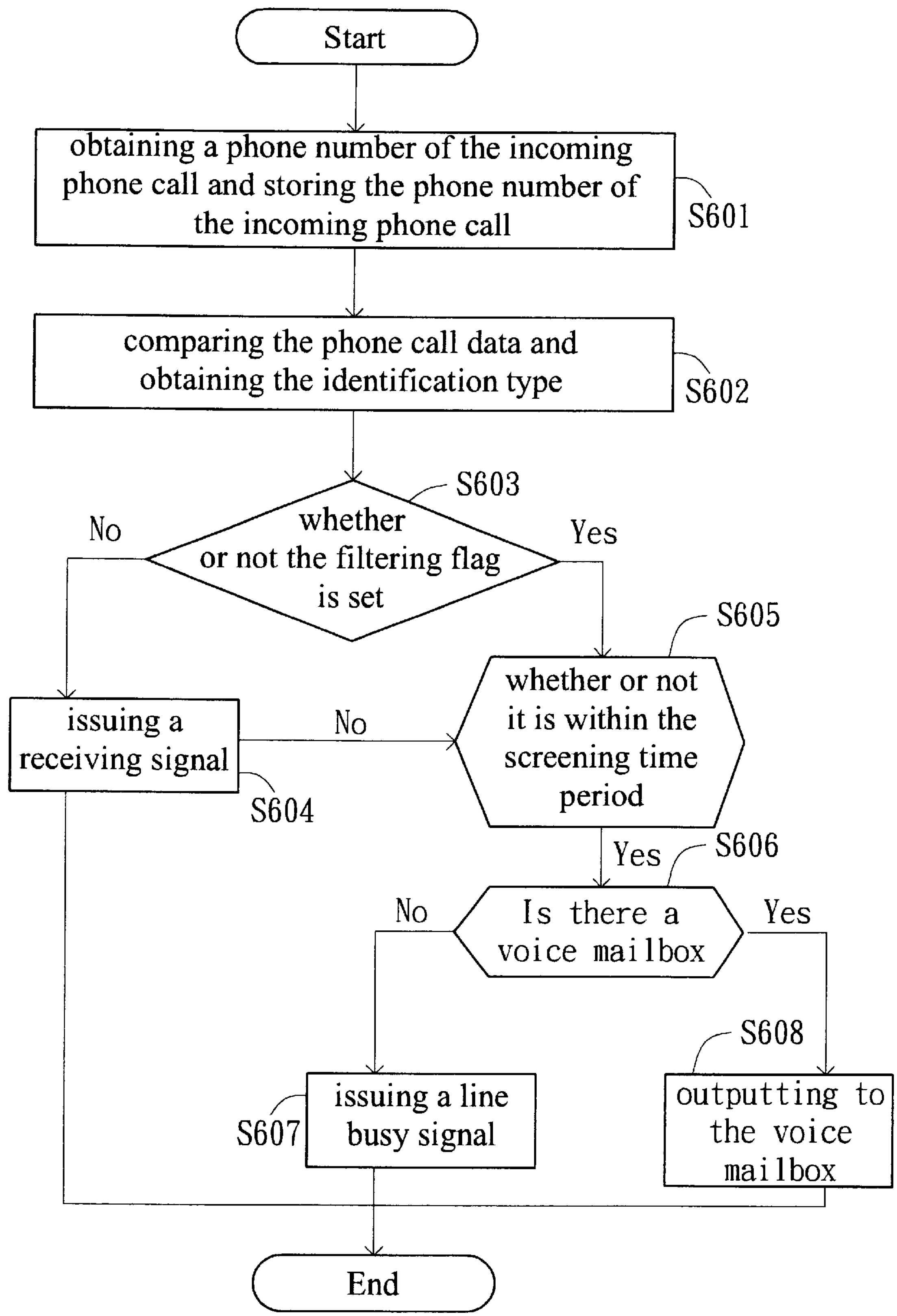
FIG. 5 is a process flow diagram, schematically illustrating the procedure about whether or not the phone number of the incoming phone call needs to be filtered, according to a preferred embodiment of the present invention.

In the step 303 (S303), when the request for signal connection is received, it is judged whether or not the phone number of the incoming phone call needs to be screened, as shown in FIG. 5. When a phone transmitting device 3 calls a phone receiving device 2 to have a request for signal connection, at first, the phone receiving device 2 obtains a phone number of the incoming phone call transmitted from the phone transmitting device 3 to the phone receiving device 2, and the phone number of the incoming phone call is stored in a register module 24, in the step S601. Then, the filtering module for an incoming phone call 25 compares the phone call data in the phone call data bank 23, so as to obtain the identification type 234 belonging to the phone number of the incoming phone call, in the step S602. Next, it is judged whether or not the identification type 234 has the filtering flag 235 in the step S603. If the identification type 234 does not have the filtering flag 235, then the output device 26 issues a receiving signal, in the step S604, so as to inform the user 1 to receive the phone call. If the identification type 234 has the filtering flag 235, then it is further enquired whether or not the current time is located within the screening time period 236 in the step S605. If it is not located within the screening time period 236, then likewise a receiving signal is issued, in the step S604, so as to inform the user 1 to receive the phone call. If the contrary, then it is belonging to the phone call with the identification type 234 that needs to be screened. Again, it is further judged whether or not a voice mailbox 237 is set in the step S606. The output device 26 then accordingly issues a line busy signal in the step S607 or the voice mailbox 237 is outputted, in the step S608. Likewise, the setup of filtering the incoming phone call after the routine is set in the step S501 is also performed like the steps of S601–S608.

In addition, the phone numbers, which are not set in the phone call data bank 23, can be treated as an unknown identification type 234 and can be processed according to the manner preset by the user 1 (whether or not the filtering flag 235 is set).

In summary of the foregoing descriptions, the apparatus and the method in intelligent type for filtering a disturbance for the incoming phone call, according to the present invention is based on the actual need of the user, so as to set the same filtering flag and the same screening time period with respect to the incoming phone calls with the identification type that is intended to be screened. As a result, the phone call data of the phone call data bank are managed and filtered by the concept of grouping manner, and therefore, the apparatus and the method in intelligent type for filtering a disturbance for the incoming phone call of the present invention can avoid the redundant setting in the tedious procedure. It can reduce the amount of time required of user for setting and changing the screening conditions. It allows the user to have better efficiency in managing the incoming phone calls.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An apparatus in an intelligent type for filtering a disturbance for an incoming phone call, implemented in a phone receiving device including a storage unit and a control panel, the apparatus comprising a phone call data bank, disposed in the storage unit, including at least one phone call data with an identification type;

a register module, disposed in the storage unit, for temporarily storing a phone number of the incoming phone call when a request for signal connection is received; and a filtering module of incoming phone, for obtaining the phone number of the incoming phone call from the register module and comparing the phone number of the incoming phone call with a filtering flag of the phone call data bank, so as to judge whether or not the phone number of the incoming call needs to be screened; and a user's interface device, disposed on the control panel, for receiving the filtering flag set by a user with respect to the phone call data having the similar identification type.

2. The apparatus in an intelligent type for filtering a disturbance for an incoming phone call as recited in claim 1, wherein the phone call data bank further stores a screening time period with respect to the filtering flag.

3. The apparatus in an intelligent type for filtering a disturbance for an incoming phone call as recited in claim 2, wherein the user's interface device further allows the user to set the screening time period with respect to the phone call data with the same identification type.

4. The apparatus in an intelligent type for filtering a disturbance for an incoming phone call as recited in claim 2, wherein the screening time period comprises a screening starting time and a screening ending time.

5. The apparatus in an intelligent type for filtering a disturbance for an incoming phone call as recited in claim 1, wherein the filtering module of incoming phone further applies an action of rejecting a signal connection to the phone number of the incoming phone call, which needs to be screened.

6. The apparatus in an intelligent type for filtering a disturbance for an incoming phone call as recited in claim 5, wherein the action of rejecting the signal connection comprises issuing a line busy signal.

7. The apparatus in an intelligent type for filtering a disturbance for an incoming phone call as recited in claim 5, wherein the action of rejecting the signal connection comprises transferring to a voice mailbox.

8. A method in an intelligent type for filter a disturbance for an incoming phone call, implemented in a phone receiving device including a storage unit and a control panel, the method comprising the steps of:

storing at least one phone call data in a phone call data bank disposed in the storage unit, the phone call data including an identification type;

allowing a user to set a filtering flag with respect to the phone call data with the same identification type;

temporarily storing a phone number of the incoming phone call into a register module disposed in the storage unit when a request for signal connection is received;

obtaining the phone number of incoming phone call from the register module and comparing the number of the incoming phone call with the filtering flag of the phone call data bank to judge whether or not the phone number of incoming phone call needs to be screened; and receiving the filter flag which is set by a user on a user's interface device disposed on the control panel.

9. The method in an intelligent type for filtering a disturbance for an incoming phone call as recited in claim 8, further comprising storing a screening time period with respect to the filtering flag into the phone call data bank.

10. The method in an intelligent type for filtering a disturbance for an incoming phone call as recited in claim 9, further comprising allowing the user to set the screening time period with respect to the phone call data having the same identification type.

11. The method in an intelligent type for filtering a disturbance for an incoming phone call as recited in claim 9, wherein the screening time period comprises a screening starting time and a screening ending time.

12. The method in an intelligent type for filtering a disturbance for an incoming phone call as recited in claim 8, further according to a comparing result, applying an action of rejecting a signal connection for the phone number of the incoming phone call, which needs to be screened.

13. The method in an intelligent type for filtering a disturbance for an incoming phone call as recited in claim 12, wherein the action of rejecting the signal connection comprises issuing a line busy signal.

14. The method in an intelligent type for filtering a disturbance for an incoming phone call as recited in claim 12, wherein the action of rejecting the signal connection comprises transferring to a voice mailbox.

* * * * *